US005747815A

United States Patent [19]

Young et al.

[11] Patent Number: 5,747,815

[45] Date of Patent: May 5, 1998

[54] MICRO-MINIATURE IONIZER FOR GAS SENSOR APPLICATIONS AND METHOD OF MAKING MICRO-MINIATURE IONIZER

[75] Inventors: Robert M. Young, Pittsburgh; Carl B. Freidhoff, Murrysville; Timothy T. Braggins; Thomas V. Congedo, both of Pittsburgh, all of Pa.

[73] Assignee: Northrop Grumman Corporation, Los Angeles, Calif.

[21] Appl. No.: 685,649

[22] Filed: Jul. 24, 1996

Related U.S. Application Data

[63] Continuation-in-part of Ser. No. 320,472, Oct. 7, 1994, abandoned, which is a continuation-in-part of Ser. No. 124,873, Sep. 22, 1993, Pat. No. 5,386,115.

[51] Int. Cl.$^{6}$ .............................. B01D 59/44; H01J 49/00

[52] U.S. Cl. .................. 250/423 R; 250/288; 250/423 F

[58] Field of Search .................................. 250/427, 423 F, 250/288, 281

[56] References Cited

U.S. PATENT DOCUMENTS

| | | | |
|---|---|---|---|
| 3,665,241 | 5/1972 | Spindt et al. | 315/351 |
| 3,718,836 | 2/1973 | Bain et al. | 315/111 |
| 3,852,595 | 12/1974 | Aberth | 250/288 |
| 3,970,887 | 7/1976 | Smith et al. | 313/309 |
| 4,822,581 | 4/1989 | Michel et al. | 423/302 |
| 4,878,094 | 10/1989 | Balkanski | 357/5 |
| 4,926,056 | 5/1990 | Spindt | 250/423 F |
| 5,043,576 | 8/1991 | Broadhurst | 250/281 |
| 5,053,343 | 10/1991 | Vora et al. | 250/424 |
| 5,138,237 | 8/1992 | Kane et al. | 315/349 |
| 5,245,192 | 9/1993 | Houseman | 250/287 |
| 5,386,115 | 1/1995 | Freidhoff et al. | 250/427 |
| 5,466,932 | 11/1995 | Young et al. | 250/289 |
| 5,481,110 | 1/1996 | Krishnaswamy et al. | 250/281 |
| 5,530,244 | 6/1996 | Sciram et al. | 250/288 |
| 5,536,939 | 7/1996 | Freidhoff et al. | 250/281 |

OTHER PUBLICATIONS

"Activation of a Multi-Emitter Silicon Carbide p-n Junction Cold Cathode" by R.V. Bellau et al., J. Phys. D: Appl. Phys., 1971, vol. 4, pp. 2022-2030.

"Micromachined Thermionic Emitters" by D.C. Perng, et al., J. Micromech. Microeng. 2 (1992) pp. 25-30.

Back-biased Junction Cold Cathodes: History and State of the Art by G. can Gorkom et al., Inst. Phys. Conf. Ser. No. 99: Section 3, 2nd International Conf. on Vacuum Microelectronics, Bath, 1989 pp. 41-52.

*Primary Examiner*—Bruce Anderson

*Attorney, Agent, or Firm*—Walter G. Sutcliff

[57] ABSTRACT

A gas ionizer is provided for use in a solid state mass spectrograph for analyzing a sample of gas. The gas ionizer is located in a cavity provided in a semiconductor substrate which includes an inlet for introducing the gas to be analyzed. The gas ionizer ionizes the sample of gas drawn into the cavity through the inlet to generate an ionized sample gas. The gas ionizer generates energetic particles or photons which bombard the gas to be sampled to produce ionized gas. The energetic particles or photons can be generated by reverse-bias p-n junctions, radioactive isotopes, electron discharges, point emitters, and thermionic electron emitters. A layer of cesium chloride or cesium iodide having a low work function is formed on top of the reverse-bias p-n junction gas ionizer to increase current emitted per junction area and so that the gas ionizer can be exposed to atmospheric oxygen during storage and can operate in reduced atmosphere with no additional treatments. The cesium chloride layer and the cesium iodide layer do not readily electromigrate. A fabrication process of the mass spectrograph includes using plural masks to ensure proper exposure of resist on both flat and wall surfaces of the semiconductor surface having severe topography.

7 Claims, 8 Drawing Sheets

FIG. 3
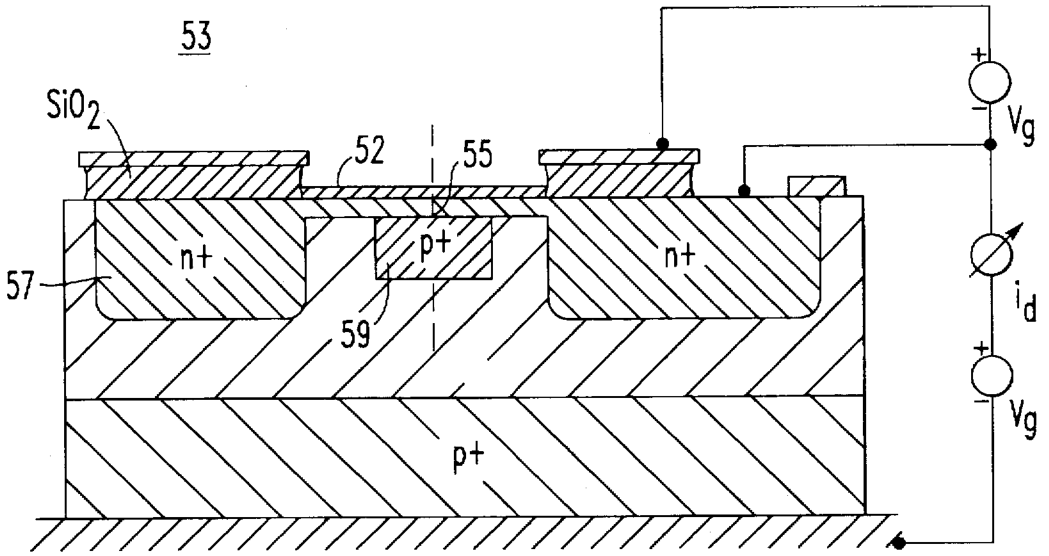
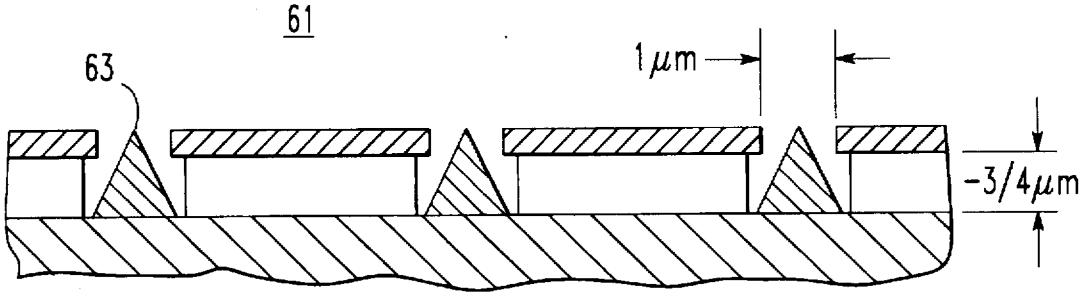
FIG. 4

MICRO-MINIATURE IONIZER FOR GAS SENSOR APPLICATIONS AND METHOD OF MAKING MICRO-MINIATURE IONIZER

CONTINUING APPLICATION

This application is a continuation-in-part of application Ser. No. 08/320,472 filed on Oct. 7, 1994 and which is now abandoned, which is a continuation-in-part of application Ser. No. 08/124,873, filed Sep. 22, 1993, U.S. Pat. No. 5,386,115. +gi

GOVERNMENT CONTRACT

The government of the United States of America has rights in this invention pursuant to Contract No. 92-F-141500-000, awarded by the United States Department of Defense, Defense Advanced Research Projects Agency.

BACKGROUND OF THE INVENTION

1. Field of the Invention

This invention relates to a gas-detection sensor and more particularly to a solid state mass spectrograph which is micro-machined on a semiconductor substrate, and, even more particularly, to the means of producing ions from the neutral gas sample.

2. Description of the Background Art

Various devices are currently available for determining the quantity and type of molecules present in a gas sample. One such device is the mass-spectrometer.

Mass-spectrometers determine the quantity and type of molecules present in a gas sample by measuring their masses. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used in any species.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

A need exists for a low-cost gas detection sensor that will work in any environment. U.S. patent application Ser. No. 08/124,873, filed Sep. 22, 1993, hereby incorporated by reference, discloses a solid state mass-spectrograph which can be implemented on a semiconductor substrate. FIG. 1 illustrates a functional diagram of such a mass-spectrograph 1. This mass-spectrograph 1 is capable of simultaneously detecting a plurality of constituents in a sample gas. This sample gas enters the spectrograph 1 through dust filter 3 which keeps particulate from clogging the gas sampling path. This sample gas then moves through a sample orifice 5 to a gas ionizer 7 where it is ionized by electron bombardment, energetic particles from nuclear decays, or in a radio frequency induced plasma. Ion optics 9 accelerate and focus the ions through a mass filter 11. The mass filter 11 applies a strong electromagnetic field to the ion beam. Mass filters which utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane which is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in a ion detector 17. Preferably, the ion detector 17 is a linear array of detector elements which makes possible the simultaneous detection of a plurality of the constituents of the sample gas. A microprocessor 19 analyzes the detector output to determine the chemical makeup of the sampled gas using well-known algorithms which relate the velocity of the ions and their mass. The results of the analysis generated by the microprocessor 19 are provided to an output device 21 which can comprise an alarm, a local display, a transmitter and/or data storage. The display can take the form shown in FIG. 1 at output device 21 in which the constituents of the sample gas are identified by the lines measured in atomic mass units (AMU).

Preferably, mass-spectrograph 1 is implemented in a semiconductor chip 23 as illustrated in FIG. 2. In the preferred spectrograph 1, chip 23 is about 20 mm long, 10 mm wide and 0.8 mm thick. Chip 23 comprises a substrate of semiconductor material formed in two halves **25*a* and 25*b* which are joined along longitudinally extending parting surfaces 27*a* and 27*b*. The two substrate halves 25*a* and 25*b* form at their parting surfaces 27*a* and 27*b* an elongated cavity 29. This cavity 29 has an inlet section 31, a gas ionizing section 33, a mass filter section 35, and a detector section 37. A number of partitions 39 formed in the substrate extend across the cavity 29 forming chambers 41. These chambers 41 are interconnected by aligned apertures 43 in the partitions 39 in the half 25*a* which define the path of the gas through the cavity 29. Vacuum pump 15 is connected to each of the chambers 41 through lateral passages 45 formed in the confronting surfaces 27*a* and 27*b***. This arrangement provides differential pumping of the chambers 41 and makes it possible to achieve the pressures required in the mass filter and detector sections with a miniature vacuum pump.

As shown in FIG. 2, the gas ionizing section 33 of the cavity 29 houses a gas ionizing system 47 which includes a gas ionizer 49 and ionizer optics 51. The gas sample drawn into the mass spectrograph 1 consists of neutral atoms and molecules. To be sensed, a fraction of these neutrals must be ionized. Different ionization schemes exist, such as photo-ionization, field ionization or chemical ionization; however, the most commonly used ionization technique in mass spectrometers and spectrographs is ionization by electronic impact. In this technique, an electron gun (e-gun) accelerates electrons which bombard the gas molecules and disassociatively ionize them.

The most common electron emitter in current mass spectrometers uses a refractory metal wire which when heated undergoes thermionic electronic emission. These can be scaled down using photolithography to micron sized dimensions. However, thermionic emitters require special coatings to resist oxidation and are power hungry, but are capable of producing relatively large amounts of electron current, approximately 1 mA.

In order to provide a micro-miniature mass spectrograph, there is a need for a micro-miniature gas ionizer which can be used in that micro-miniature mass-spectrograph.

SUMMARY OF THE INVENTION

In order to achieve the above-noted object and others, a gas ionizer is provided for use in a solid state mass spectrograph for analyzing a sample of gas. The gas ionizer is located in a cavity provided in a semiconductor substrate which includes an inlet for introducing the gas to be analyzed. The gas ionizer ionizes the sample of gas drawn into the cavity through the inlet to generate an ionized sample gas. The gas ionizer generates energetic particles or photons which bombard the gas to be sampled to produce ionized gas. The energetic particles or photons can be electrons generated by reverse-bias p-n junctions, nuclear decay products from radioactive isotopes, electrical discharges, field effect point emitters, and thermionic electron emitters.

Due to the sensitivity of the detectors used in the spectrograph 1, and to the higher gas pressure in the ionization section 33 made possible by the differential vacuum pumping, much smaller electron beam currents, about 1 μA are required of the e-gun. Several emitters can meet this requirement. One such emitter is the field effect cold cathode emitter which uses a sharpened point or edges to create a high electric field region which enhances electron emission. Such cathodes have been tested up to 50 μA beam current, and are readily fabricated by semiconductor lithographic techniques. One disadvantage of field emission cold cathode is the tendency to foul from contaminants in the test gas. Therefore, differential pumping of the cathode is required. A second e-gun scheme is the reverse bias p-n junction which is less prone to fouling and is, therefore, the preferred electron emitter for the spectrograph of the invention. The reverse bias p-n junction sends an electron current racing through the solid state circuit. Near the surface, the very shallow junction permits a fraction of a highest energy of electrons to escape into the vacuum. Such small electron currents are required that a thin gold film will produce the desired emissions over a long time.

In a preferred embodiment, photolithographic processing of a gas ionizer formed on a semiconductor substrate having severe topography includes the use of two masks to expose the resist, before the resist is developed, to enable precise exposure of the resist on flat surfaces and walls of the semiconductor surface so that all areas of resist may be completely removed regardless of thickness.

In a further preferred embodiment, a coating having a low work function is deposited thermally on top of a completed p-n junction diode structure gas ionizer so as to increase current emitted per junction area, so that the gas ionizer may be exposed to atmospheric oxygen during storage and so as to enable operation in a reduced atmosphere with no additional treatments. In a still further preferred embodiment, the coating may be an alkali halide salt. In an additional further preferred embodiment, the coating may be cesium chloride. In an even further preferred embodiment, the coating may be cesium iodide. These coatings of the preferred embodiments are unlikely to suffer the effects of electromigration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 3 is a schematic drawing of a reverse-bias p-n junction electron emitter gas ionizer of a first embodiment of the present invention.

FIG. 4 is a schematic drawing of a point emitter gas ionizer of a second embodiment of the present invention.

DETAILED DESCRIPTION OF THE PREFERRED EMBODIMENTS

Most mass spectrometers 1 and other gas sensors requiring gaseous ions for their sensing accomplish ionization by bombardment. Electrons are typically used as the bombarding particle, although other particles can also be used. These spectrometers use electron guns which produce electrons with sufficient energy to ionize sample gas molecules. This is accomplished by accelerating the electrons, once emitted, to a potential of 75–100 volts. In this range, most gases have peak production of ions by electron impact.

The mass spectrograph 1, as presently envisioned, requires an electron emission current of 1 microAmp into a sample gas at 100 milliTorr pressure. This current, accelerated to 100 V and colliding with the gas molecules, produces a sufficient number of ions for the mass filter to separate and the detector to sense.

Figure 1:
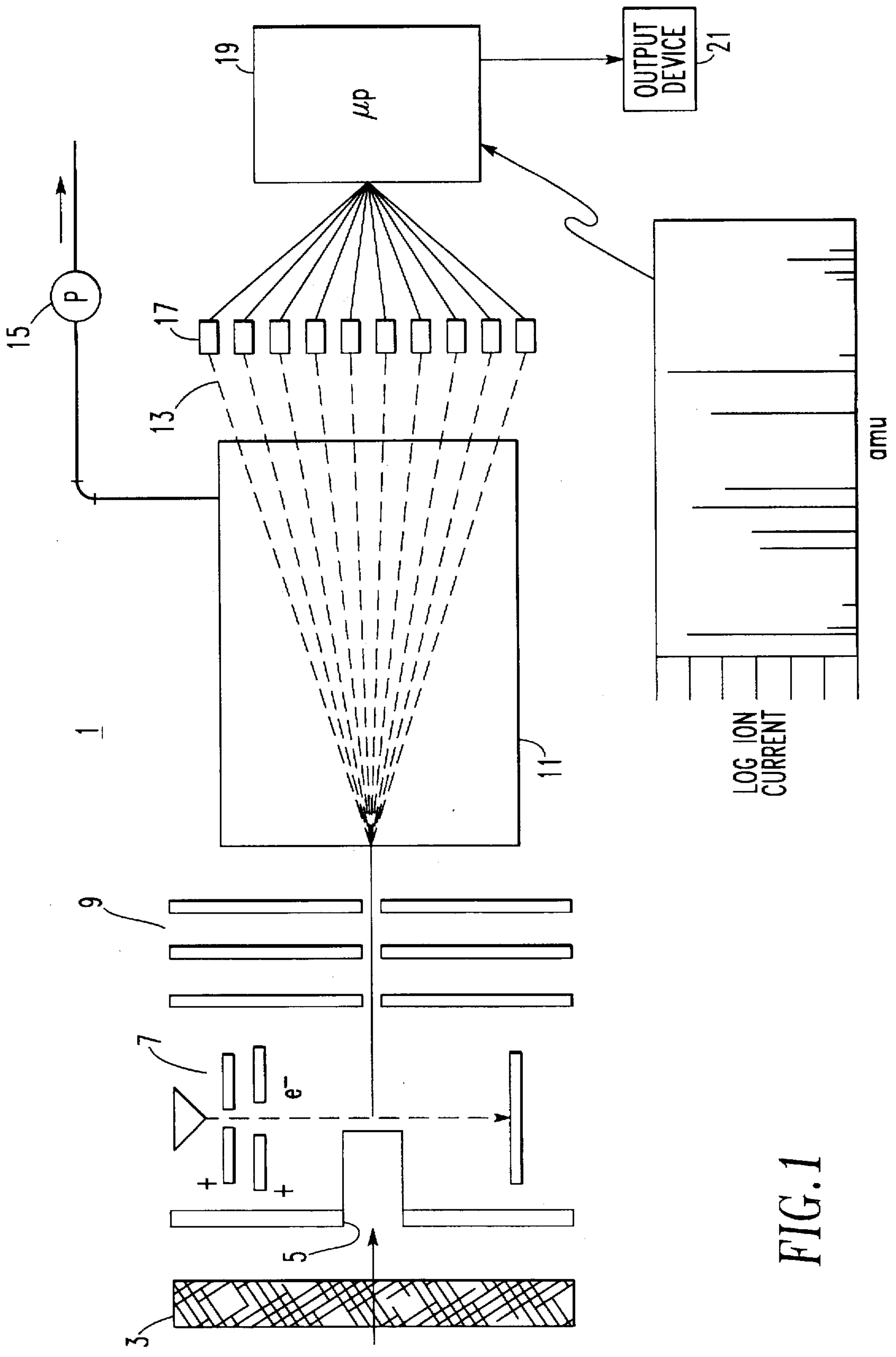
FIG. 1 is a functional diagram of a solid state mass-spectrograph in accordance with the invention.
Figure 2:
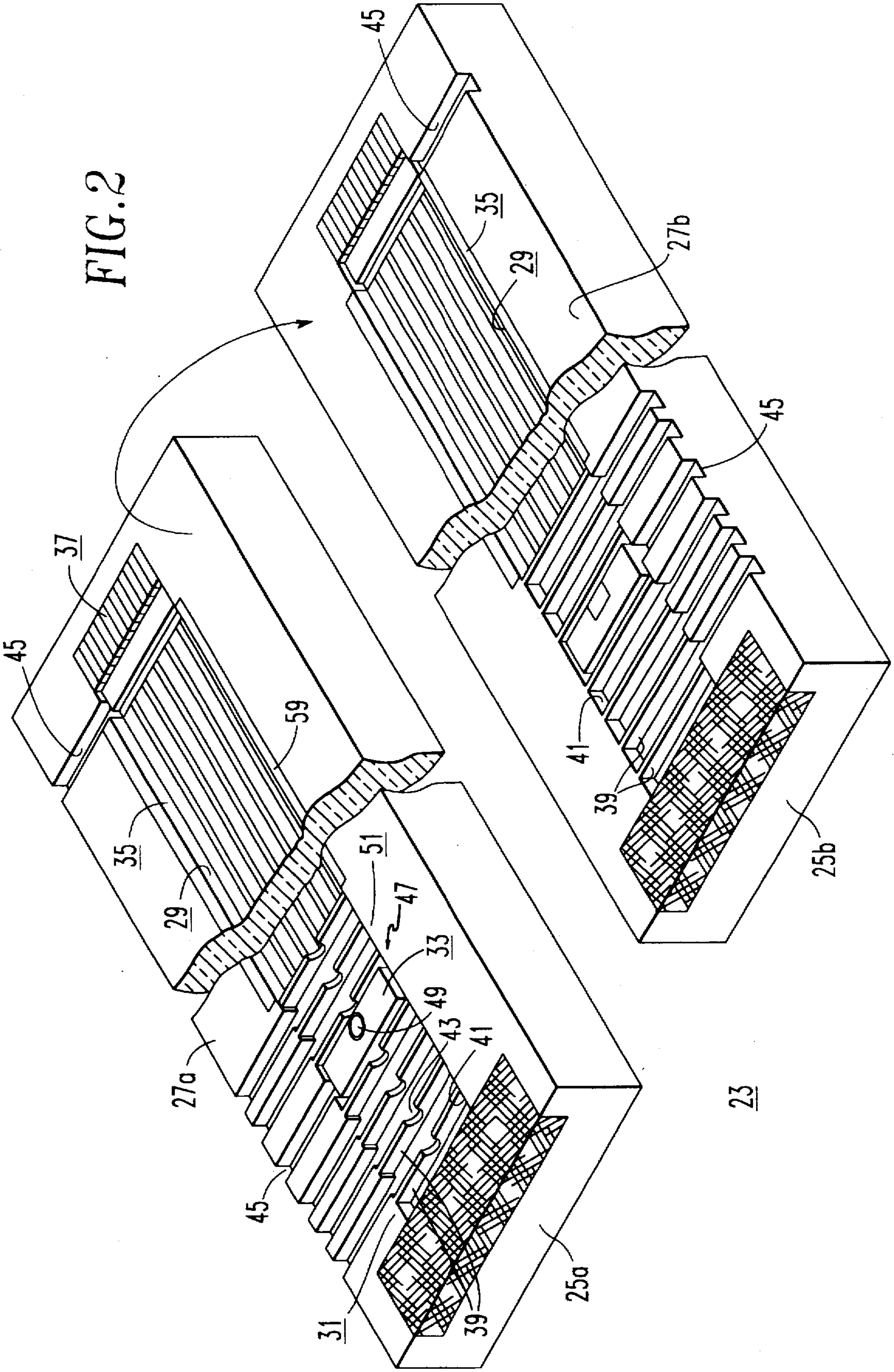
FIG. 2 is a isometric view of the two halves of the mass-spectrograph of the invention shown rotated open to reveal the internal structure.

As shown in FIG. 2, ionization takes place inside a chamber 49, where the electrons impact the gas molecules. The ions thus created are extracted through ion optics 51 and fed into the mass filter 35 and detector regions 37. Fabrication of the electron emitter takes place at the bottom of a well, the cavity formed by this well defining the ionization chamber 49.

Electrons are emitted from the bottom of the well, travel across the cavity striking gas molecules along the way, and are collected at the top of the well. In order to fabricate the miniature mass spectrograph 1 in silicon on a few substrates for subsequent assembly, a number of devices and electrodes are formed over very severe topography, as compared to state of the art silicon microelectronics fabrication. In microelectronics, the majority of photolithography utilize masks on steppers that reduce the image on a mask into the photoresist applied to the top of a semiconductor substrate, such as silicon. The reduction can be four, five and up to ten times in the present state of the art fabrication.

The depth of field is limited over which the features can be reproduced due to the optical schemes to achieve the size reduction. The typical depth of field is approximately one micrometer with optical photolithography found in the majority of semiconductor fabrication lines. Although there are techniques for exposing thick photoresist layers to permit the electroplating of metals and other materials in the removed resist volumes, there are no known techniques for exposing resist photolithographically to form etched or lift-off features over substrate topographies greater than 5 micrometers in height.

The application of photoresist on silicon substrates for microelectronics fabrication is typically performed through the use of spinning. In spinning, a photosensitive material is dissolved in a fast drying solvent and dispensed onto a silicon substrate that is then spun to remove the excess material and leave behind a continuous, thin coating onto the silicon substrate. This photoresist layer is then exposed to some form of radiation in a desired pattern to remove unwanted regions of resist to permit modification of the underlying substrate through either etching or deposition of additional materials. This works well over the shallow topographies encountered in semiconductor fabrication.

In order to fabricate the miniature mass spectrograph 1, the topography to be covered by photoresist is approximately 40 micrometers in vertical height. Devices must be fabricated in the bottom of the well and attached via metallization to the top surface of the substrate. This can be accomplished through a combination of sprayed photoresist and novel contact masking steps to minimize the number of masks and maintain a reasonable line definition. This technique allows the micro electromechanical fabrication of a miniature mass spectrograph 1, along with the associated microelectronics control devices to make a cost-effective, general purpose, gas sensing device practical.

In the fabrication of the miniature mass spectrograph 1, one of the first fabrication steps is the formation of the deep wells which essentially form the vacuum walls of the subsequent mass spectrograph 1. Use of spun-on resist, even with the use of adhesion promoters, exhibits resist breakage at the edges of the deep wells. This is true over a wide range of spin speeds and with different resist types.

The pull-away, or breaking, of the resist at the edges of the well is thought to be possibly due to the resist viscosity not becoming high enough during the spinning process, when the excess resist is being removed. Removal of the solvent would increase the viscosity, but would not allow thin photoresist layers to be spun on practically. An application that causes the resist viscosity to become higher is desired.

For printed circuit boards, photoresists are applied by spraying, but the thickness and design rules are much more relaxed when compared to those required for the miniature mass spectrograph 1. Spraying was tried with the 40 micrometer deep well topographies and was found to be usable with photoresists and contact photolithography. Spinning of the substrate can be used, but is not necessary. The preferred spray device is an air brush type. Although the thickness of spray resists can be made uniform over flat surfaces, the spray resists are thicker at the walls of the wells, which makes subsequent photolithography definition difficult.

In order to achieve definition of metal lines from the bottom of the well, over the edge, and on top of the substrate surface, a series of two masks is used. One mask is primarily for the definition of the features on the flat portion of the substrate where the exposure is needed to be controlled to define the fine features in the thinner resist. The second mask is required to expose the thicker resist at the walls of the well. This separation of the masking in the same step to take into account the differing thicknesses of resist, prevents the need to overexpose with one mask, which limits the smallest size of a feature definable along the flat portions found at the bottom of the well and the top of the substrate. This process of using two masks in one photolithography step reduces the number of steps that would be utilized to separately define features in the flat portions of the MEMS device and the overlaying of masking levels. This also allows smaller features, i.e., smaller design rules to be incorporated into MEMS structures with severe topographies. Presently with contact lithography, 4 micrometer features can be easily defined over a 40 micrometer topography. This is smaller than the 5 micrometer feature desired in the present design. Features as small as two micrometers are thought to be possible with this technique with further refinements.

A photolithography resist process of a miniature mass spectrograph 1 of a preferred embodiment of the present application will now be described with reference to FIGS. 5–9.

Figure 5:
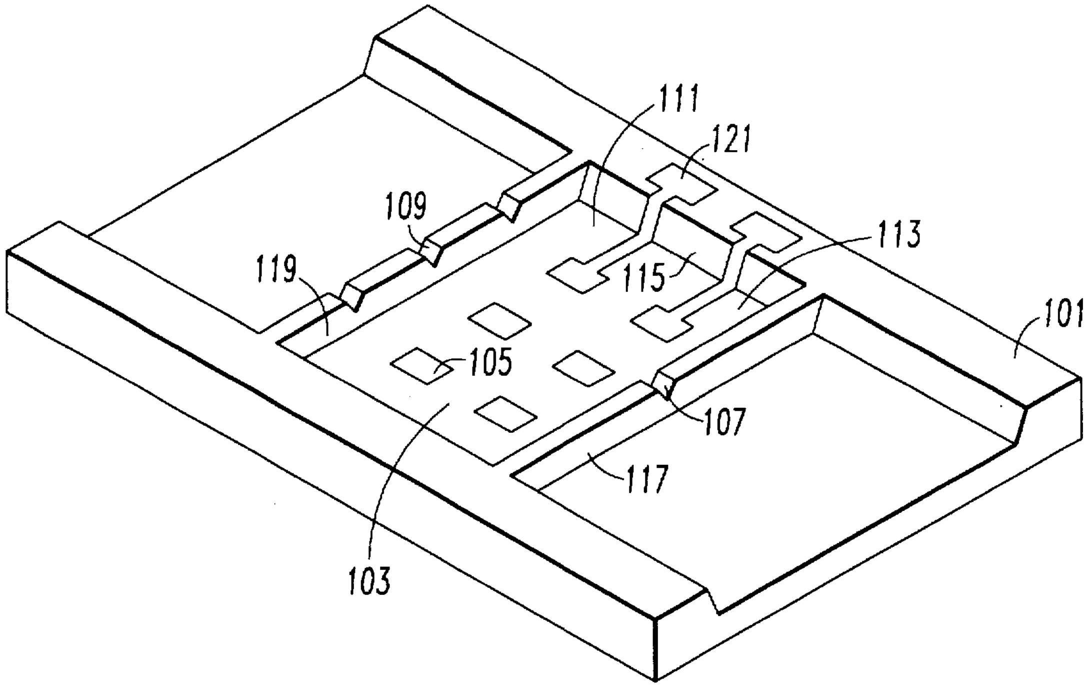
FIG. 5 is a plan view of a semiconductor chip half including an ionizer chamber having metallization layers and terminals.

FIG. 5 illustrates a plan view of a section of a miniature mass spectrograph of a preferred embodiment of the present application. A semiconductor chip half 101 is illustrated as including ionizer chamber 103 having ionizers 105 formed therein as an ionizer array. Aperture 107 and apertures 109 are formed respectively in partitions 117 and 119. A plurality of metallization layers 111 are illustrated as formed along chamber floor 113 and chamber wall 115 of ionizer chamber 103 to provide an electrical path between ionizers 105 and terminals 121. In a preferred embodiment, chamber wall 115 may have a vertical height of 50 micrometers, but is not necessarily limited to this particularly disclosed vertical height. It is also to be understood that the various structures and features can be processed onto semiconductor chip-half 101 using various techniques that would be within the level of ordinary skill.

The photolithography resist process of a preferred embodiment of the present application enables precise resist removal having line resolution on the order of 5 to 8 micrometers over severe topography such as described above with respect to the miniature mass spectrograph illustrated in FIG. 5. The photolithography resist process incorporates the use of standard lithography equipment and sprayed resist techniques. As will be described hereinafter in connection with FIGS. 6–9, two masks are used to expose a resist layer applied to the surface of semiconductor chip half 101.

Figure 6A:
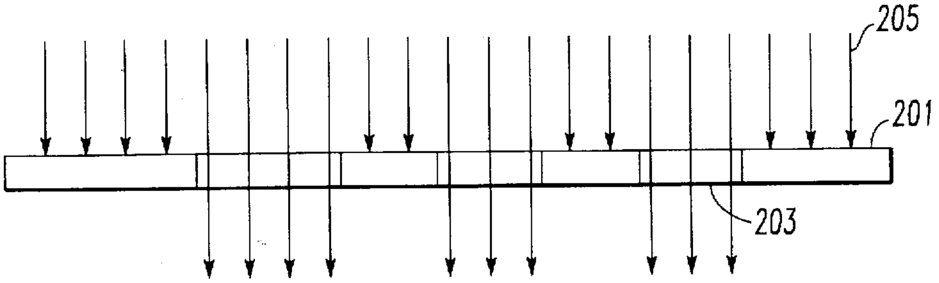
FIGS. 6A–6C illustrate a photolithography resist process for a flat or nearly flat wafer with a uniform resist coating.
Figure 6B:
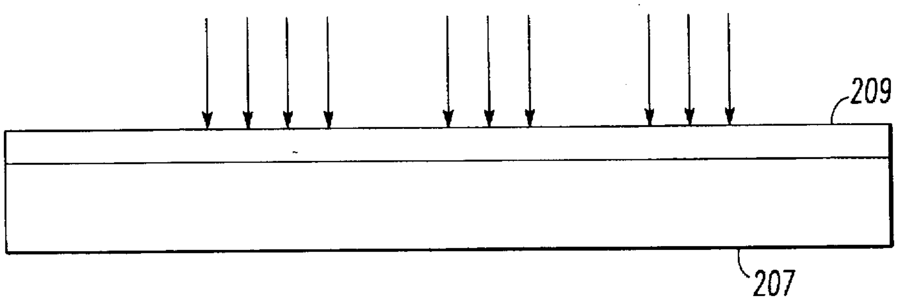
Figure 6C:
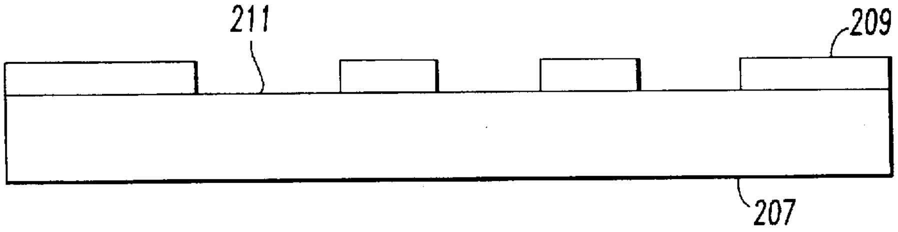

In order to further understanding of the preferred embodiments of the present application, a photolithography resist process wherein a uniform coating of resist is exposed by a mask in order to replicate mask features in the resist is described with respect to FIGS. 6A–6C. FIG. 6A illustrates mask 201 as including transparent portions 203 for passing exposure radiation 205 from an unillustrated source therethrough. The exposure radiation 205 which passes through transparent portions 203 of mask 201 expose selected portions of resist layer 209 formed on semiconductor chip 207, as illustrated in FIG. 6B. The corresponding exposed resist is subsequently removed such that openings or windows 211 are formed in resist layer 209 through to the surface of semiconductor chip 207, as illustrated in FIG. 6C.

A photolithography resist process wherein a uniform resist layer is formed on a semiconductor surface having severe changes in surface topography is illustrated in FIGS.

Figure 7A:
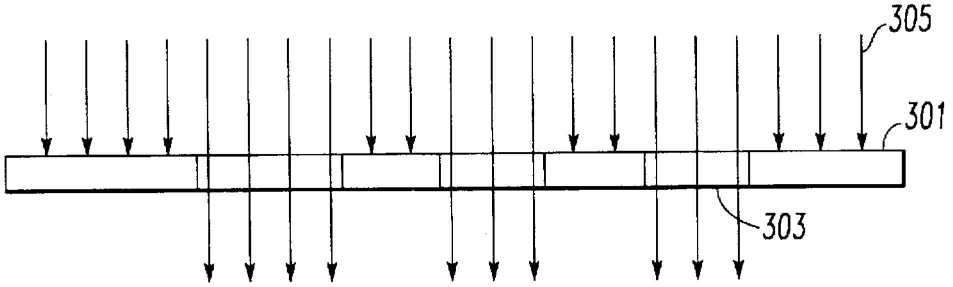
FIGS. 7A–7C illustrate a photolithography resist process for a semiconductor chip having a large change in topography.
Figure 7B:
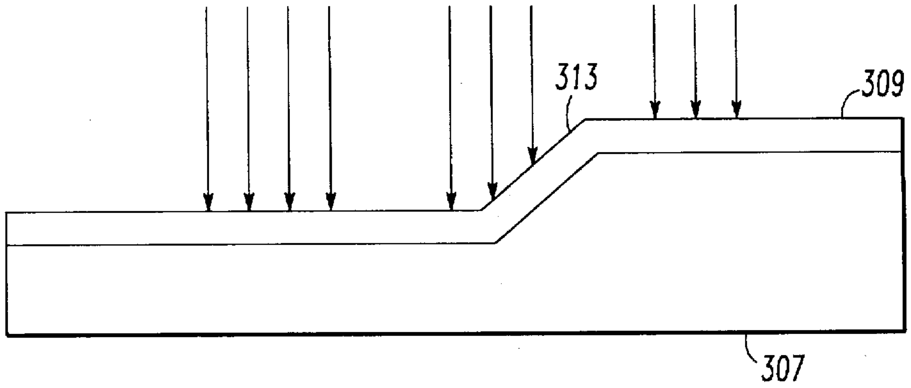
Figure 7C:
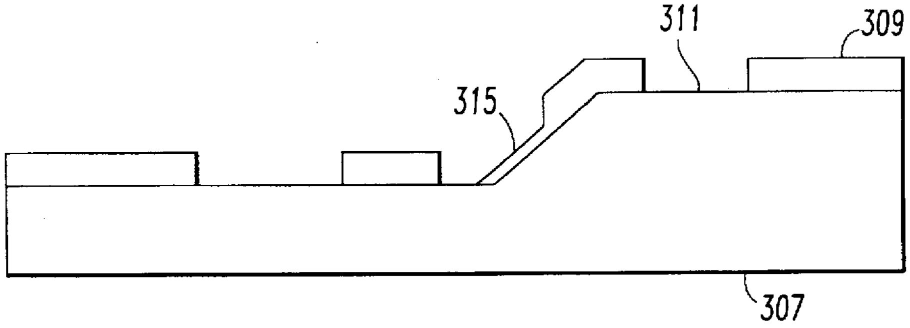

7A–7C. As can be readily understood in view of FIG. 7B, resist layer 309 on wall portion 313 of semiconductor chip 307 is thicker in the vertical direction of exposure radiation 305. As a result, when resist layer 309 is exposed to radiation predetermined to precisely expose the resist on flat portions of the surface of semiconductor chip 307 other than wall portion 313, resist layer 309 at wall portion 313 will be underexposed. Due to underexposure of resist layer 309, an unremoved resist layer 315 remains on the surface of semiconductor chip 307 after a subsequent resist removal step, as illustrated in FIG. 7C. If photoresist layer 309 is overexposed in order to prevent the occurrence of unremoved resist layer 315, features of the semiconductor chip may be washed out in vertically thinner resist areas, thereby reducing reproducible line size.

Figure 8A:
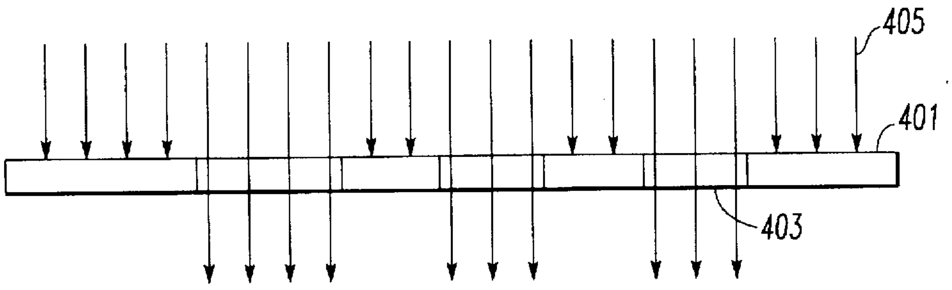
FIGS. 8A–8C illustrate a photolithography resist process for a semiconductor chip having a large change in topography and a non-uniform photoresist layer.
Figure 8B:
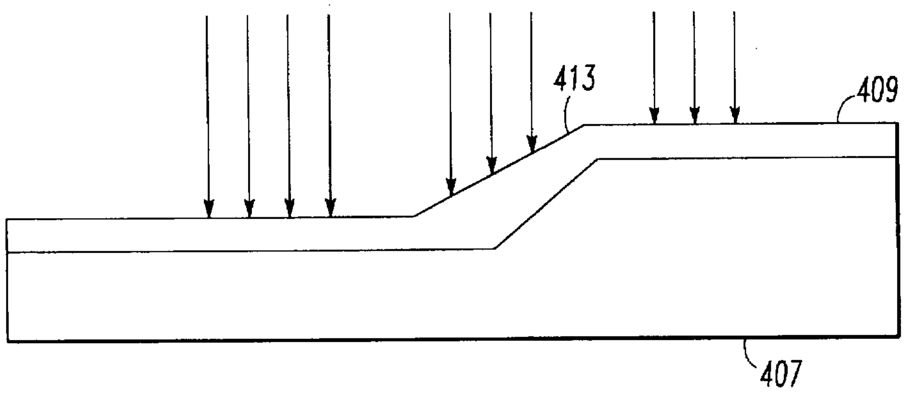
Figure 8C:
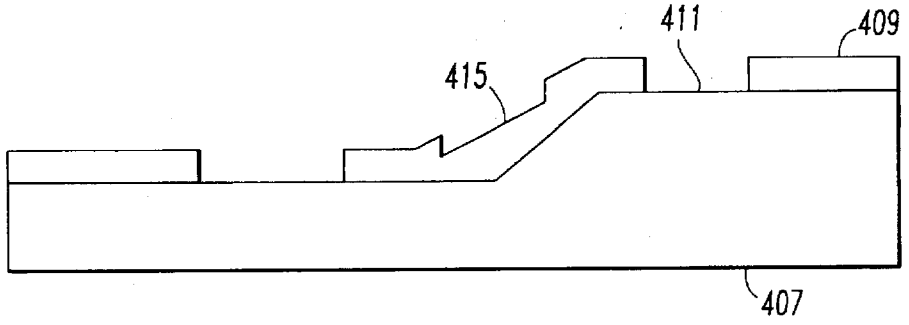

An example of a photolithography resist process wherein resist layer 409 is non-uniformly formed on semiconductor chip 407 is illustrated in FIGS. 8A–8C. The resist is illustrated in FIG. 8B as accumulated against wall portion 413, such that the vertical thickness of resist layer 409 along the direction of exposure radiation 405 is increased to an even greater extent than described with respect to FIGS. 7A–7C. Resist layer 409 tends to build up as illustrated in FIG. 8B in the case of large topographies having height differences greater than three micrometers. As can be understood from FIG. 8C, if resist layer 409 is exposed to radiation predetermined to precisely expose the resist on flat portions of the surface of semiconductor chip 407, resist layer 409 at wall portion 413 will be underexposed and unremoved resist layer 415 will remain after the subsequent resist removal step. The use of single mask 401 does not clear the feature near wall portion 413.

Figure 9A:
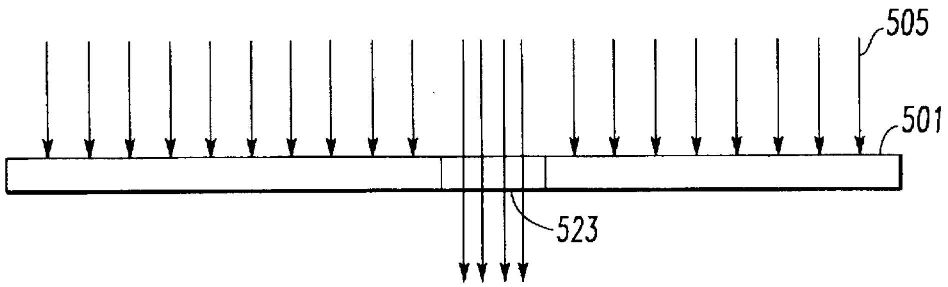
FIGS. 9A–9D illustrate a photolithography resist process of a preferred embodiment of the present application which uses plural masks to prevent overexposure and underexposure of the non-uniform resist layer.
Figure 9B:
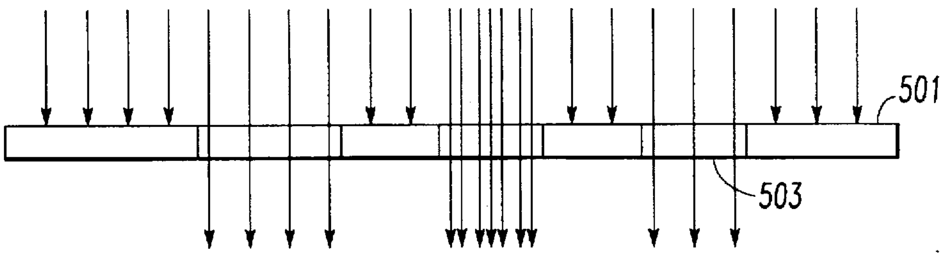
Figure 9C:
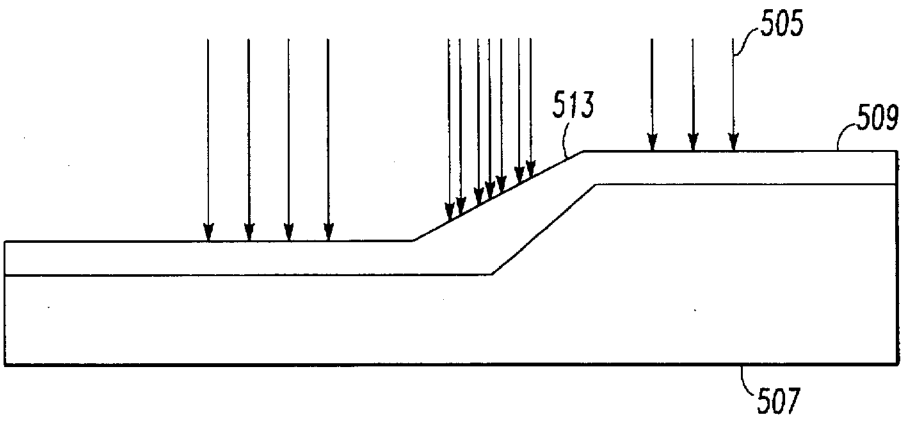
Figure 9D:
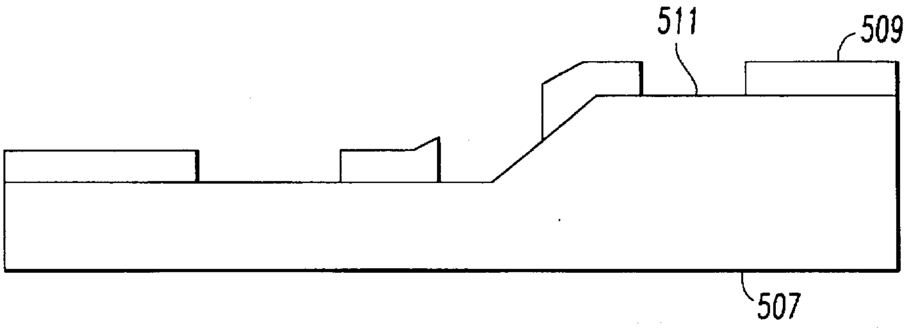

A photolithography resist process of a preferred embodiment of the present application in which first and second masks 501 and 521 are used to customize the exposure of resist layer 509 is described with reference to FIGS. 9A–9D. As illustrated, mask 521 includes only transparent portion 523 aligned with wall portion 513. It is to be understood that mask 521 may include a plurality of transparent portions 523 for exposing corresponding areas of the resist layer for a plurality of respective wall portions or other topographical features. Mask 501 includes plural transparent portions 503 which are respectively aligned with the desired areas of resist layer 509 which are to be exposed, including wall portion 513. A first resist exposure is performed with mask 501 such that resist layer 509 is completely exposed with exposure radiation 505 from an unillustrated source along the vertically thinner portions on the flat surface portions of semiconductor chip 507. As a result, these selected areas of resist layer 509 are completely exposed and the resist layer on the area of wall portion 513 is underexposed. Semiconductor chip 507 is subsequently exposed again with exposure radiation 505 from an unillustrated source using mask 521 such that wall portion 513 is further exposed with radiation 505 through transparent portion 523 of mask 521. As a result, resist layer 509 at wall portion 513 is completely exposed and thus entirely removed during the subsequent resist removal step, as illustrated in FIG. 9D.

The use of more than one mask as described in this preferred embodiment enables fine features to be defined in the vertically thinner uniform areas of resist layer 509 and complete exposure and removal of resist layer 509 which accumulates non-uniformly near severe changes in surface topography of semiconductor chip 507, such as wall portion 513, without washing out fine features. As illustrated in FIG. 9D, resist layer 509 is completely removed in the vicinity of wall portion 513. It is to be understood that this process may be used on any non-uniformly deposited or formed resist layer, such as by spinning or any other known method within the grasp of ordinary skill. The multiple masks must be used prior to the resist development phase of the photolithography resist process. It is to be further understood that exposure is not necessarily limited to first and second masks and that a plurality of masks may be used. Also, the preferred embodiment as described with reference to FIG. 9 is not necessarily limited such that resist layer 509 is first exposed with radiation using mask 501 and then subsequently exposed using mask 521. Resist layer 509 may be first exposed with radiation using mask 521 and the subsequently exposed using mask 501.

The above-described photolithography resist process as embodied in FIG. 9 results in line resolution on the order of five to eight micrometers over steps as great as 50 micrometers using multiple masks to expose the resist before developing it. The use of plural masks ensures proper exposure of resist on flat surfaces using one of the masks and proper exposure of resist on the walls of the structure using the other masks. Accordingly, the problems associated with resist thickness variation can be avoided. This photolithography resist process enables fabrication of p-n junction emitters on a same structure as a mass filter. Conventionally, such p-n junction gas ionizers are fabricated separately and then aligned to the rest of the structure during assembly. This photolithography resist process also improves alignment of components and reduces the number of wafers to be run to allow low cost batch fabrication.

Returning to FIG. 2, a reverse bias p-n junction can be used as the electron gun in gas ionizer 49. It has been known for decades that reverse bias p-n junction semiconductor diodes can emit electrons into the vacuum. A schematic of a reverse bias p-n junction semiconductor diode 53 is shown in FIG. 3. The p-n junction 55 is found at the center of this device 53, where a shallow, 10 nm layer of implanted n-type semiconductor 57 meets the p-type 59. Reverse biasing of this diode 53 causes a small fraction of the electrons in the circuit to emit to the vacuum.

In the past, many investigators have been concerned with increasing the current emitted per junction area of the electron source for use in CRT displays. Exotic methods, such as adding a monolayer coating of low work function cesium on the exterior surface, have been used. However, for the mass spectrograph 1, this current density requirement can be reduced by approximately 5 orders of magnitude. The electron gun needed for operation of the mass spectrograph 1 is only 1 microAmp.

With further regard to the use of low work function cesium as an added monolayer coating on the exterior surface of a reverse bias p-n junction gas ionizer, cesium is attractive since it has one of the lowest work functions known to man and enables up to 8% of the current flowing through the junction to be emitted therefrom as electrons. However, a problem with cesium is that it also has a high mobility which means that it can be moved easily. As a result, the current flowing through the junction tends to move the cesium layer off the junction. This effect is referred to as electromigration.

In a further preferred embodiment of the present application, a layer of cesium chloride is added as a coating on the exterior surface of the p-n junction area and functions to increase the current emitted per junction area. In the alternative, the coating may be cesium iodide. Although the work functions of cesium chloride and cesium iodide are not as low as the cesium coating as described previously, the problem of electromigration is greatly lessened as the bigger chlorine or iodine atoms prevent the cesium from migrating off the p-n junction. In addition to providing low work functions, the cesium chloride or cesium iodide coatings provide the emitter with an oxygen tolerance so that the device can be exposed to atmospheric oxygen during storage and can operate in a reduced atmosphere with no additional treatments.

It is to be understood that the coating of this preferred embodiment is not necessarily limited to cesium chloride or cesium iodide. This coating may consist of an alkali (Group 1A of the periodic table) halide salt deposited thermally on the top surface of a completed p-n junction structure. The alkaline metals would preferably be selected from a group consisting of potassium, rubidium, cesium and francium. The halides would preferably be selected from a group consisting of fluorine, chlorine, bromine and iodine. The thickness of the coating must be on the order of 100 to 500 Å, but is not as critical as with metal films such as gold or with Group 2A oxides. As illustrated in FIG. 3, a cesium chloride or cesium iodide coating 52 is formed on the surface of the p-n junction 55.

It is to be further understood that for enhancement of the emission efficiency and to provide durability for the emitting surface in oxidizing atmospheres, thin coatings of gold or oxides of barium, calcium or other such materials can be deposited onto the junction surface. The surface energies for some of these materials are lower than that for silicon, but need to be thin to allow the energetic electrons to penetrate the bulk with sufficient energy to be released into the region above the junction. The coating will also act as a barrier to oxidizing neutral gases and ions from reaching the surface and altering the junction's characteristics.

Cold cathode p-n junction electron emitters have been demonstrated as the electron source in a conventional mass spectrometer. Other feasible embodiments have also been used.

Radioactive isotopes can also be used in place of the electron gun. Through radioactive decay processes, radioisotopes emit subatomic particles or high energy photons which, upon impact with a gas molecule, can ionize these molecules. Thus to their advantage such ionizers require no electrical power. To their disadvantage they are not amenable to switching on and off like an electrically powered ionizer.

Regulatory limits and licensing requirements also place obstacles to the use of radioisotopes in sensors. Here another advantage to the miniaturization of gas sensors in general, and mass spectrograph 1 in general, comes forward. The amounts of radioisotopes required is tiny, often near or below the exemption limit. This then places a great commercial advantage to the use of radioisotope ionizers in micro-sensors, as it potentially obviates the need for licensing, tracking, and disposal.

The mass spectrograph 1 requires generation of about 1 million ions per second for operation. Any number of radioisotopes may be used to create this quantity. Some of the examples currently under study are $^{45}$Ca, $^{241}$AM, $^{63}$Ni, $^{90}$Sr, $^{210}$Po, and Tritium, the last element being held in a palladium host.

The mass spectrograph ionization chamber 49 may be modeled using radioisotopes as a rectangular tube, coated on four walls with the radioactive material, and having gas flow through this tube. Half of the decays go off into the surrounding support structure (silicon for the mass spectrograph 1), and half travel through the gas volume. The model system is 100 micrometers by 100 micrometers by 100 micrometers, with varying thicknesses of the different radioactive layers applied, depending on each particular material's subatomic emission characteristic. The model volume is held at a pressure of 10 Torr.

As a particular example, Polonium 210, which has a short half life of 138.4 days, and decays as a 5.3044 MeV alpha particle close to 100% of the time, can be reviewed. In 0.0011% of these alpha decays, the particle emitted departs with 4.3044 minus 0.803 MeV, which leaves the daughter isotope in an excited state. This daughter then de-excites by emitting a 0.803 MeV gamma ray photons. About 4 micrograms of this Polonium isotope should produce about 2.3 billion gas ions per second in the model volume.

The 4 micrograms of Polonium 210, spread out over the four walls of the 100 micron rectangular tube, forms a layer 10 micrometers thick. The pure material generates a small amount of heat, so it may be useful to dilute the radioactive element in a host matrix.

This amount of $^{210}$Po results in about 0.6 billion alpha disintegrations per second, or about 16 milliCuries. In 1986, the exemption limit for $^{210}$Po was 0.1 microCuries. Licensing is thus required for this modeled amount of $^{210}$Po. Note that 0.0011% of the decays are accompanied by the emission of a 0.803 MeV gamma ray. If the source is as little as 1 cm away from the user, the resulting gamma ray dose is less than 1 millRem in any one hour, and drops off with further distance as $1/r^2$. (Here r is the distance from the source.) A dosage of less than 2 milliRem in any one hour is a general criterion for (non-continuous) public access to a location. Thus, gamma ray dose is not a significant issue. Finally, disposal is less complicated, as after 6.55 years the Polonium has decayed below the exemption limit.

Better yet, reducing the amount of radioactive $^{210}$Po used in the mass spectrograph 1 by a factor of 2000 drops the system to an initial activity of 8.0 microCuries, which will decay to 0.1 microCurie in 2.4 years. The initial gamma ray dose is about 0.5 microRem in any one hour, which is some forty times smaller than natural background. This will, of course, also reduce the number of gas ions produced by the same factor of 2000. Since some mass spectrograph designs require production of only 1 million ions per second, this now becomes feasible and attractive.

Electrical discharges which operate across a gaseous conducting medium can also be used as the ion source. The electrical current flowing through the discharge volume may be direct current or alternating current, from frequencies of a few Hertz up through radio-frequencies in the kiloHertz and megahertz and beyond into the microwave at gigaHertz. Such discharges have already been reduced down to the 100 micrometer dimension for use in flat panel displays, where the electrons accelerated in the discharge field, collide with gas molecules (e.g. neon) and create photons (light) emission.

Structurally, such discharges are very simple, basically consisting of two flat plate conductors facing each other across a gap (typically a few hundred micrometers). These plates may be covered with a dielectric layer (typically an oxide chosen for its secondary electron emission characteristics) which insures that the ac discharge operates in the capacitive mode. Electrons are created both by other electrons impacting gas molecules, and by secondary emission when electrons collide with the ionization chamber's electrode walls. Operating voltages are typically 100–150 Volts.

Since this means of ion production has already been reduced to miniature, this is an attractive potential component for mass spectrograph 1. However, the ions created in an ac discharge on these dimensions have a kinetic energy of about 1–2 eV. The range of ion energies produced in a gaseous discharge limits the resolution of mass spectrograph 1, because it increases the ion beam size through the mass filter and its projection onto the detector pads. Thus a gas discharge ionizer is a workable, though not necessarily preferred, embodiment for a mass spectrograph 1. Use of an electrostatic analyzer to narrow the kinetic energy spread of the ions presented to the mass analyzer increases the resolution capability and is covered in a co-pending patent application.

Point emitters can also be used as the electron gun in ionization chamber 49. This class of emitters consists of small, sharpened points, which create high electric fields at their tips, emitting electrons. These emitters are sometimes referred to as "Spindt" cathodes. They operate at or close to room temperature, and are thus a type of cold cathode. A schematic of such a point emitter 61 is shown in FIG. 4. The points 63 may take various forms, with cones being most popular, but pyramids and wedges have also been used. Materials used for field emitter points are metals and semiconductors.

Arrays of such emitters were used as the electron source for the ionizer section of a (macroscopic) mass spectrometer built for space exploration. Typically, peak emission currents for individual tips 63 range from 1–100 microAmps. Thus, to produce enough electron current for a macroscopic mass spectrometer, arrays of multiple emitter tips 63 are required. However, for mass spectrograph 1, only one tip 63, operating at very low current, is required.

Point emitters are subject to fouling; they usually operate in vacuums far below $10^{-5}$ Torr. Oxygen is usually the destructive agent. Since a primary market for mass spectrograph 1 is atmospheric sampling, and since the ionizer section of mass spectrograph 1 is expected to operate at a vacuum pressure of 100 milliTorr, protection of the tip 63 is necessary. Advantageously, the current needed for the mass spectrograph 1 from this single tip 63 is well below the peak possible.

Recently, work has begun on the use of gold coatings to protect these cold cathodes. Other air resistant emission materials have been used in point emitters, such as diamond coatings. Protection of the emitter tip can help emission current, and prolong lifetime.

Thermionic electron emitters can also be used as electron guns. Thermionic electron emitters differ from the other cathodes mentioned above by operating at very high temperatures, often 2000° K or more. They are the most common electron gun source used in today's bench top size mass spectrometers. Such instruments use an Ohmically heated refractory metal wire, usually tungsten, coated with a low-work function substance. Barium or lanthanum oxides are a common choice, as this combines a moderately low work function with a degree of oxidation resistance.

Small and microscopic incandescent elements for microlamp and electron emission has been demonstrated from metal microbridges fabricated by integrated circuit lithography, with currents up to 10 nanoAmps. Lifetimes were only in the minute range.

Still, with the proper choice of materials, a thermionic electron emitter can be used as the ionizer source in the mass spectrograph 1. Again, due to the minuscule electron current required for the mass spectrograph 1, miniaturization of a thermionic electron course for gas bombardment and ionization is quite viable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims in any and all equivalents thereof.

We claim:

1. A mass spectrograph gas ionizer comprising:

a semiconductor substrate having a first planar surface;

a cavity formed within the first planar surface of said semiconductor substrate, the cavity having an inlet through which a sample of gas to be analyzed is drawn and an outlet through which the sample of gas is passed; and a plurality of gas ionizers formed within the cavity for ionizing the sample gas, said plurality of gas ionizers being reverse-bias p-n junction diodes, said reverse-bias p-n junction diodes having an alkali halide salt layer formed thereon.

2. The mass spectrograph gas ionizer of claim 1, wherein the alkali halide salt layer comprises a halogen atom selected from a group consisting of fluorine, chlorine, bromine and iodine.

3. The mass spectrograph gas ionizer of claim 2, wherein the alkali halide salt layer is cesium chloride.

4. The mass spectrograph gas ionizer of claim 2, wherein the alkali halide salt layer is cesium iodide.

5. The mass spectrograph gas ionizer of claim 1, wherein said alkali halide salt layer comprises an alkali metal selected from a group consisting of potassium, rubidium, cesium and francium.

6. The mass spectrograph gas ionizer of claim 5, wherein the alkali halide salt layer is cesium chloride.

7. The mass spectrograph gas ionizer of claim 5, wherein the alkali halide salt layer is cesium iodide.

* * * * *